United States Patent
St. Romain et al.

(10) Patent No.: US 9,357,687 B2
(45) Date of Patent: Jun. 7, 2016

(54) APPARATUS AND METHOD FOR AERATING SOIL

(71) Applicant: Textron, Inc., Providence, RI (US)

(72) Inventors: Thomas E. St. Romain, Lake Charles, LA (US); Ernest Randall New, Mer Rouge, LA (US)

(73) Assignee: Textron Inc., Providence, RI (US)

( * ) Notice: Subject to any disclaimer, the term of this patent is extended or adjusted under 35 U.S.C. 154(b) by 66 days.

(21) Appl. No.: 14/216,016

(22) Filed: Mar. 17, 2014

(65) Prior Publication Data

US 2014/0262366 A1   Sep. 18, 2014

Related U.S. Application Data

(60) Provisional application No. 61/852,229, filed on Mar. 15, 2013, provisional application No. 61/852,230, filed on Mar. 15, 2013.

(51) Int. Cl.
*A01B 45/02* (2006.01)

(52) U.S. Cl.
CPC .................................. *A01B 45/023* (2013.01)

(58) Field of Classification Search
CPC ................................................... A01B 45/023
USPC ...................................................... 172/21, 22
See application file for complete search history.

(56) References Cited

U.S. PATENT DOCUMENTS

| | | |
|---|---|---|
| 2,800,066 A | 7/1957 | Cohrs et al. |
| 5,069,293 A | 12/1991 | St. Romain |
| 5,570,746 A | 11/1996 | Jones et al. |
| 5,709,272 A | 1/1998 | Jones et al. |
| 5,810,092 A | 9/1998 | Selvatici |
| 5,816,336 A | 10/1998 | Underhill |
| 5,868,206 A | 2/1999 | Miller |
| 6,003,613 A | 12/1999 | Reincke |
| 6,199,637 B1 | 3/2001 | Wiedenmann |
| 6,948,568 B2 | 9/2005 | Banks |
| 7,730,960 B1 | 6/2010 | Knight et al. |

(Continued)

FOREIGN PATENT DOCUMENTS

| | | | | |
|---|---|---|---|---|
| DE | 4323315 A1 | * | 1/1995 | |
| DE | 19630961 A1 | * | 2/1998 | ............. A01B 13/08 |

(Continued)

OTHER PUBLICATIONS

PCT Search Report, PCT/US/2014/030430, Aug. 11, 2014.

*Primary Examiner* — Jamie L McGowan
(74) *Attorney, Agent, or Firm* — Polster Lieder (57) ABSTRACT

A soil aerating apparatus movable along a soil surface in a first direction during soil aerating operations comprises a frame assembly and a plurality of reciprocating arm assemblies. Each arm assembly comprises a tine holder for retaining a tine, an upper arm pivotally attached between the tine holder and the frame assembly, a lower arm pivot attached between the tine holder and the frame assembly, wherein the lower arm is positioned below the upper arm, and a drive arm pivotally attached between a crankshaft and the lower arm. In an embodiment the crankshaft comprises a plurality of central shaft sections and a plurality of eccentric shaft sections, wherein each eccentric shaft section moves in the first direction when each eccentric shaft section is positioned above the plurality of central shaft sections during soil aerating operations.

22 Claims, 4 Drawing Sheets

(56) References Cited

U.S. PATENT DOCUMENTS

| | | |
|---|---|---|
| 8,051,917 B2 | 11/2011 | Wiedenmann |
| 8,291,992 B2 | 10/2012 | de Bree |
| 8,376,062 B2 * | 2/2013 | Wiedenmann ................. 172/21 |
| 8,479,836 B2 | 7/2013 | Jones |
| 8,485,272 B2 | 7/2013 | Hermanus et al. |
| 8,602,120 B2 | 12/2013 | Reincke |
| 8,616,296 B2 | 12/2013 | De Bree |
| 2002/0056554 A1 | 5/2002 | Hargreaves et al. |
| 2006/0185567 A1 * | 8/2006 | Hargreaves et al. .......... 111/118 |
| 2008/0217034 A1 | 9/2008 | de Bree |
| 2008/0257571 A1 | 10/2008 | Keane et al. |
| 2009/0166048 A1 | 7/2009 | Wiedenmann |
| 2009/0200050 A1 | 8/2009 | Bos |
| 2011/0061880 A1 * | 3/2011 | De Bree ............................ 172/1 |
| 2013/0255976 A1 * | 10/2013 | Georgoulias et al. ............ 172/2 |

FOREIGN PATENT DOCUMENTS

| | | | | |
|---|---|---|---|---|
| DE | 102005055289 B3 * | 3/2007 | ............. | A01B 45/02 |
| NL | 1007900 C2 * | 6/1999 | | |

* cited by examiner

APPARATUS AND METHOD FOR AERATING SOIL

CROSS-REFERENCE TO RELATED APPLICATIONS

The present application is a non-provisional application claiming priority to the U.S. provisional patent application having the Ser. No. 61/852,229, entitled "Turf Aerator," filed on Mar. 15, 2013, and to the U.S. provisional patent application having the Ser. No. 61/852,230, entitled "Aerator Head," filed on Mar. 15, 2013. Both provisional patent applications are incorporated herein by reference in their entirety.

SPECIFICATION

1. Field

The present invention relates to an apparatus for aerating soil and a method of aerating soil.

2. Background

Grounds covered by lawn or turf, especially those forming part of parks or sports facilities such as, for example, golf courses, football fields, or racecourses, require special care and attention to ensure the correct distribution of the grass cover and compactness of the soil. Specifically, the soil surface must be uniformly covered by turf and loose enough to allow good drainage, while at the same time remain compact enough for easy treading or allow sport to be played thereon.

In lawn or turf areas, particularly those that experience sustained vehicular and pedestrian traffic, the turf surface and underlying soil can become undesirably compacted. The problems associated with soil compaction are that rain and fertilizing chemicals are prevented from fully penetrating the soil, which causes the turf area to remain soggy for longer periods after a rain and inhibits a deep and healthy grass root system and proper grass growth. Therefore, it is also necessary to sufficiently loosen up the soil to allow efficient drainage and to allow nutrients to penetrate to the root system, which enhance the cultivation of grass.

Soil or turf aeration is the process of creating channels in the soil so that water, air, and fertilizers can penetrate the ground and be dispersed effectively throughout the soil. Such treatment of the soil can be carried out using appropriate implements or machines which make holes in the soil in order to confer the properties described above.

A number of soil aerating devices exist to try to solve the above problems. These devices may be self-propelled or linked to the power take-off (PTO) of a tractor and may be equipped with means for vertically articulating a plurality of aerating pins or spikes, typically referred to as tines. The holes can be made in a succession of steps comprising driving a mechanism having a plurality of arms (i.e., tine heads or tine holders), which can comprise a plurality of tines connected at the bottom end thereof, which are repeatedly inserted into and out of the ground (e.g., cycled or reciprocated) while the soil aerating device moves along the surface of the soil, which is typically covered by grass or turf.

However, the prior art soil aerating devices incorporate aerating techniques that can damage the surface of the soil and/or the grass root system. For example, a number of devices use an arc motion while driving the tines into and out of the soil. The arc motion tends to disrupt the surface of the soil, by creating an opening having a size greater than necessary, which is particularly problematic on golf courses. The arc motion also tends to cause the tine to not penetrate to its full depth and cause inconsistent depth of penetration, as the energy to drive the tine is spread out over a greater surface.

Furthermore, while other devices cause minimal surface damage, they include an aerating pin which is inserted into the soil and moved in an arc in such a way as to widen the bottom of the vertical hole underneath the soil. These devices produce a hole that is shaped substantially like a cone, wide at the bottom and tapering up to a narrower opening at the top. Therefore, while the ground surface suffers minimal damage, the tines under the ground surface rip through the grass root system, causing considerable damage. Most fine turf is grown on sand based soils and the newer varieties of fine turf grass have shallower roots and cannot stand the excessive motion of the tines underneath the soil because of damage to the root system. These soil aerators can also damage the surface of the soil if the tines do not fully penetrate the soil to the preset depth, and the lower portions of the tines perform the arc motion close to the soil surface or at the soil surface, tearing the top of the turf and soil. This scenario commonly occurs in uneven or heavily compacted soils.

Other prior art deep spike soil aerators comprise a tine head (i.e., tine holder assembly) that is in a fixed operating position, meaning that the angle of the support arm is fixed in a single position and the tines will enter the ground at different angles when the length of the tine is changed. If the angle of entry cannot be changed when a longer tine length is used, then more aggressive heaving of the turf will ensue. Conversely, the tines will be laid back and pointing towards the direction of travel (i.e., toward the soil aerator frame) when shorter tines are used. Neither of these scenarios is desirable for smooth aeration on fine turf, such as golf greens. A soil aerator, which can maintain the tine head perpendicular to the soil at all stages of the downstroke, will require no adjustment or less frequent adjustment of the tine head angle as the tines are always oriented perpendicular with the soil, even if the tine lengths are changed and when the depth of aeration is adjusted. A soil aerator, incorporating such a feature, prevents operator error, saves time on the initial set up and produces smoother turf with less disruption from the aerating tines. Therefore, a new soil aerator is needed that will maintain an substantially vertical tine orientation as the tines are inserted into and retracted from the soil during the course of soil aerating operations, irrespective of the tine insertion depth.

Furthermore, most prior art deep spike aerators employ a common design feature that places an aerator roller directly beneath a center of the soil aerator frame. Such placement of the roller is very ineffective and causes problems during operation. Specifically, when the roller is placed directly beneath the frame, it creates a pivot point whereby the downward force of the aeration tine will roll (i.e., partially rotate or thrust) the soil aerator forward, towards the tractor, creating vibration and accelerated wear to the tractor attachments and the PTO. Also, when heavily compacted soils are encountered, certain tines may not fully penetrate the soil, and the soil aerator, especially the crankshaft, will experience uneven counter forces (i.e., recoil) resulting in torque forces disrupting the integrity of the frame and causing misalignments of the crankshaft and other aligned parts, as well as premature bearing wear due to the misalignments. Therefore, a need exists for a soil aerator, producing a downward force at the tine heads, that is sufficient to fully penetrate compacted soils, without increasing the size or the weight of the soil aerator. A need exists for a soil aerator that provides a greater soil penetrating force, which in turn provides a consistent soil penetration depth.

Furthermore, smoother soil aerating operation is obtained by moving the lower pivot point of the tine head higher above the ground. Prior art deep spike aerators have a lower pivot (e.g., wrist pin pivot) point that is typically only five inches or less from the top of the turf. A low pivot point will cause more movement of the tine under the ground, which causes more heave and disruption of fine turf as the tines try to exit the ground from between five to ten inches or more below the surface. A low pivot point can also result in more turf damage as the tine head and the tine will significantly pivot forward with the motion of the tractor to create a large arc shaped hole under the ground. In other situations, a low pivot point can result in the tines being dragged along the turf, which results in a rip or a slit along the surface of the turf. The turf aerator is needed that comprises a lower head pivot located relatively high above the soil (e.g., 5 to 20 or more inches above soil) during aeration operations, resulting in no damage or minimal damage to the turf as the soil aerator moves along the surface.

Embodiments usable within the scope of the present disclosure meet these needs.

SUMMARY

The present disclosure is directed to a soil aerating apparatus movable along a soil surface in a first direction during soil aerating operations. The soil aerating apparatus comprises a frame assembly, a crankshaft rotatably attached to the frame assembly, wherein the crankshaft can comprise a plurality of central shaft sections and a plurality of eccentric shaft sections, and wherein each eccentric shaft section can move in the first direction when each eccentric shaft section is positioned above the plurality of central shaft sections during soil aerating operations. The soil aerating apparatus can further comprise a plurality of reciprocating arm assemblies, wherein each reciprocating arm assembly can comprise, a tine holder for retaining a tine, and an upper arm having a first end and a second end. The first end of the upper arm can be pivotally attached to the tine holder at a first upper pivot point, and a second end of the upper arm can be pivotally attached to the frame assembly at a second upper pivot point. A lower arm, having a first end and a second end, can be positioned below the upper arm, wherein the first end of the lower arm can be pivotally attached to the tine holder at a first lower pivot point, and wherein the second end of the lower arm can be pivotally attached to the frame assembly at a second lower pivot point. The soil aerating apparatus can further comprise a drive arm having a first end and a second end, wherein the first end of the drive arm can be pivotally attached to a first eccentric shaft section of the plurality of the eccentric shaft sections, and wherein the second end of the drive arm can be pivotally attached to the lower arm between the first lower pivot point and the second lower pivot point.

The present disclosure is further directed to a soil aerating apparatus adapted for moving along the soil surface in a first direction. The soil aerating apparatus can comprise a plurality of arm assemblies, and each arm assembly can comprise a tine holder arm for retaining a tine and an upper arm having a first end and a second end, wherein the first end of the upper arm can be pivotally attached to the tine holder at a first upper pivot point, and wherein the second end of the upper arm can be pivotally attached to the frame at a second upper pivot point. A lower arm, having a first end and a second end, can be positioned below the upper arm, wherein the first end of the lower arm can be pivotally attached to the tine holder at a first lower pivot point, and wherein the second end of the lower arm can be pivotally attached to the frame at a second lower pivot point. The soil aerating apparatus can further comprise a drive arm having a first end and a second end, wherein the first end of the drive arm can be pivotally attached to a first eccentric shaft section of the plurality of the eccentric shaft sections, and wherein the second end of the drive arm can be pivotally attached to the lower arm, between the first lower pivot point and the second lower pivot point. In an embodiment of the soil aerating apparatus, the second upper pivot point can be positioned farther in a second direction relative to the second lower pivot point, wherein the second direction is opposite the first direction, wherein a distance between the first upper pivot point and the first lower pivot point is larger than a distance between the second upper pivot point and the second lower pivot point, wherein a distance between the first lower pivot point and the second lower pivot point is larger than a distance between the first upper pivot point and the second upper pivot point.

The present disclosure is further directed to a method of aerating soil. The method comprises the steps of providing a soil aerating apparatus comprising a frame, a crankshaft attached to the frame, a tine holder, an upper arm connected to the frame and to the tine holder, a lower arm connected to the frame and to the time holder, and a driving arm connected to the crankshaft and to the lower arm. The method can further comprise moving the soil aerating apparatus at a first horizontal speed in a first horizontal direction along a soil surface, moving the tine holder from its highest position to its lowest position in a first period of time, moving the tine holder from its lowest position to its highest position in a second period of time, wherein the second period of time is longer than the first period of time.

The foregoing is intended to give a general idea of the invention, and is not intended to fully define nor limit the invention. The invention will be more fully understood and better appreciated by reference to the following description and drawings.

BRIEF DESCRIPTION OF THE DRAWINGS

In the detailed description of various embodiments usable within the scope of the present disclosure, presented below, reference is made to the accompanying drawings, in which.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The soil aerator described and disclosed herein includes a new deep spike, deep tine apparatus for aerating soil that improves the overall performance of prior art deep tine aerating machines and also reduces maintenance and operation cost associated therewith.

Specifically, the soil aerator disclosed herein will outperform prior art designs in terms of depth of penetration, smoothness of operation, less disruption to soil and grass turf, and lower horsepower requirement for drive tractor. These advantages are obtained through the use of one or more unique designs, which make the soil aerator of the present disclosure advantageous over the prior art designs. Another advantage of the soil aerator presently disclosed is a reduction in maintenance down time and maintenance costs, while producing a better quality turf.

Figure 1:
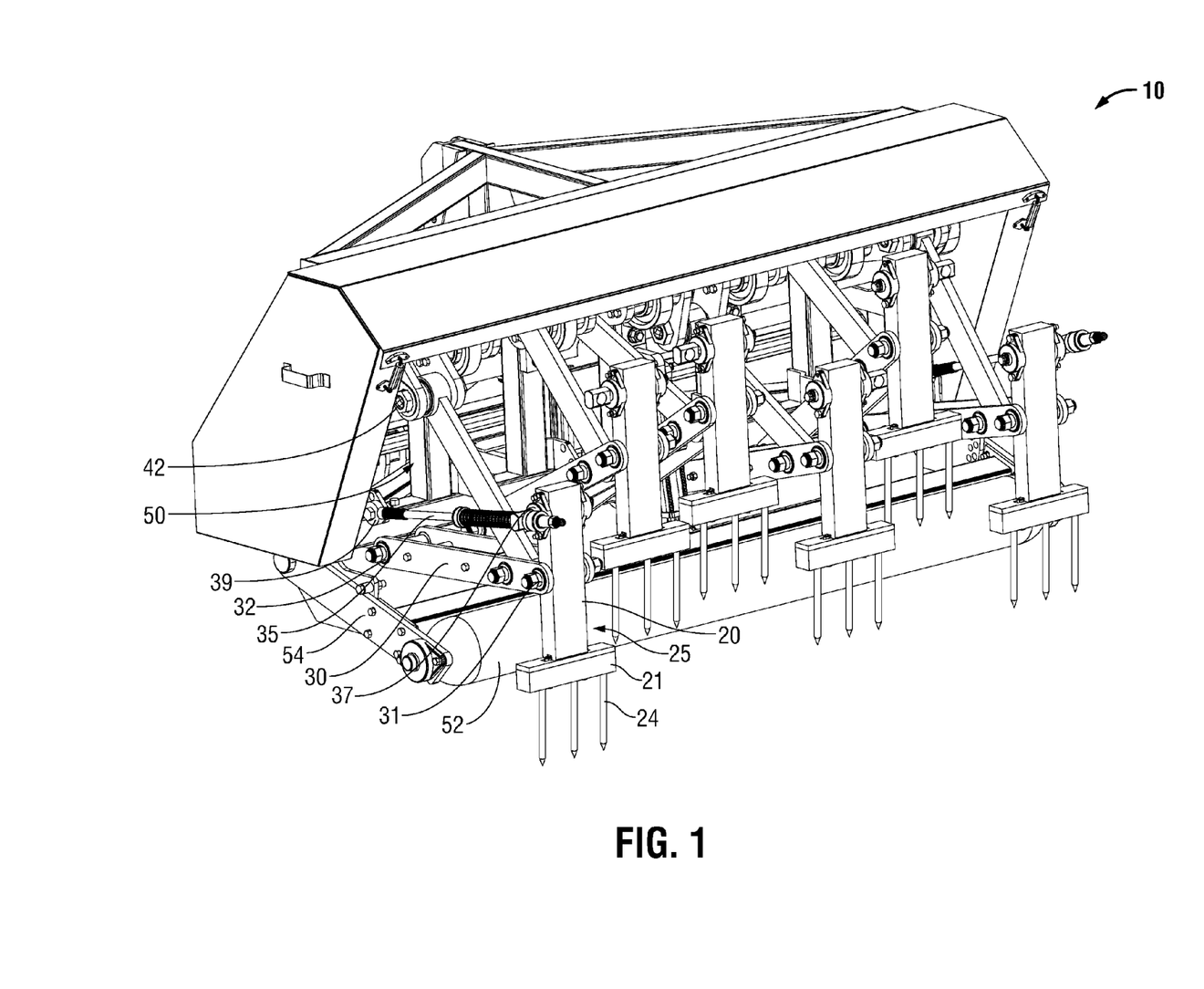
FIG. 1 depicts a perspective view of an embodiment of a soil aerating apparatus in accordance with the present disclosure.
Figure 2A:
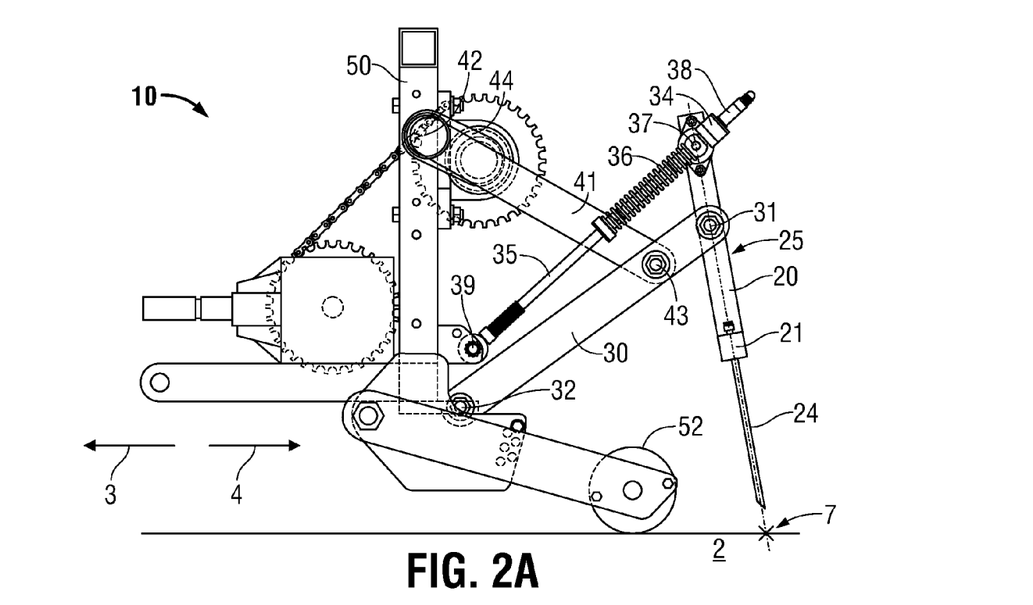
FIG. 2A depicts a cross-sectional side view of an embodiment of a soil aerating apparatus in accordance with the present disclosure, showing a tine head located in top of stroke position.
Figure 2B:
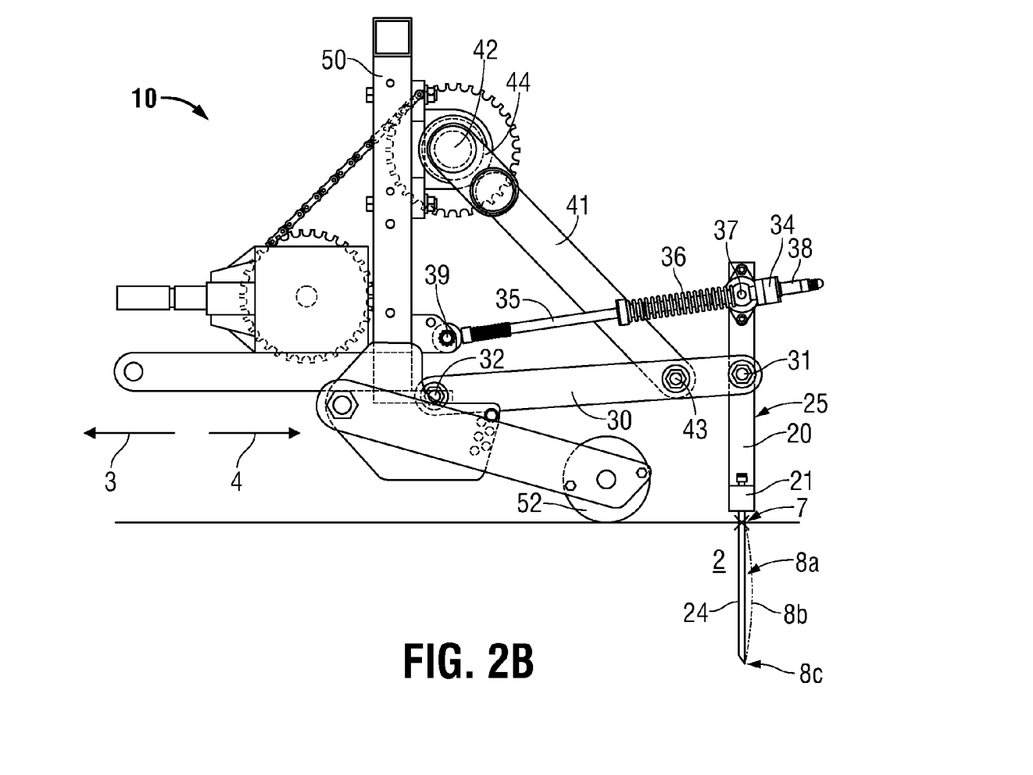
FIG. 2B depicts a cross-sectional side view of an embodiment of a soil aerating apparatus in accordance with the present disclosure, showing a tine head located in bottom of stroke position.

Referring now to FIG. 1, depicting a perspective view of an embodiment of a soil aerating apparatus, referred to as a soil aerator (10), and FIGS. 2A and 2B, depicting a side cross-sectional view of an embodiment of a soil aerator (10), in accordance with the present disclosure. More particularly, FIGS. 1, 2A, and 2B depict a tine holder assembly, referred to as a tine head (25), comprising a support arm (20) connected to a tine attachment member (21), which is adapted to hold one or more tines (24). The support arm (20) is shown pivotally attached to the first end of the lower linkage arm (30) (i.e., second linkage arm) at a lower head pivot (31), located on the support arm (20). FIGS. 1, 2A, and 2B further depict the support arm (20) pivotally attached to the first end of the upper linkage arm (35) (i.e., first linkage arm) at an upper head pivot (37) located on the upper portion the support arm (20). The upper head pivot (37) can allow the upper linkage arm (35) to slide therethrough, allowing relative linear motion, in addition to pivoting motion, between the upper linkage arm (35) and the support arm (20).

FIGS. 1, 2A, and 2B further depict a soil aerator frame (50), which supports various components of the soil aerator (10). The second end of the lower linkage arm (30), opposite the first end, is shown connected to the lower rear portion of the frame (50) at the lower frame pivot (32). The second end of the upper linkage arm (35), opposite the first end, is shown connected to the rear portion of the frame (50) at the upper frame pivot (39), located above the lower frame pivot (32). FIGS. 2A and 2B show the tine head (25) in a top of stroke and a bottom of stroke positions, respectively, which further depict the upper frame pivot (39) located in a rearward horizontal direction (4) with respect to the lower frame pivot (32). Specifically, the upper frame pivot is located about one inch in the rearward direction (4) with respect to the lower frame pivot (32). FIG. 2B depicts the upper head pivot (37) positioned directly over the lower head pivot (31), when the tine head (25) is in the bottom of the stroke position. FIGS. 2A and 2B further depict the lower frame pivot (32) and the upper frame pivot (39) spaced closer together than the distance between the lower head pivot (31) and the upper head pivot (37). Lastly, the distance between the upper frame pivot (39) and the upper head pivot (37) is shown smaller than the distance between the lower frame pivot (32) and the lower head pivot (31). Please note that the soil aerator (10), in FIG. 1, is not depicted with additional upper linkage arms connected between the frame (50) and the additional tine heads, for clarity purposes.

The depicted relative positioning or connection between the support arm (20), the upper linkage arm (35), the lower linkage arm (30), and portions of the frame (50), are configured to maintain the support arm (20) in an essentially constant orientation with respect to a target point (7) at the surface of the soil (2) at all times throughout the entire soil aerator (10) cycle of operation. Specifically, the arm (30, 35, 20) configuration described herein enables the tine head (25) and, therefore, the tine (24) to remain directed at (e.g., point to) a single target point (7) or location throughout the upward and/or downward motion of the tine head (25). This feature allows the use of tines (24) of different lengths, without the need to adjust the tine (24) entry angle (22, see FIG. 3) every time a different set of tines (24) is used. It should be noted that a cycle of operation of the soil aerator (10) comprises a full rotation of a crankshaft (44), which results in one up and down motion (e.g., stroke) of the tine head (25). FIG. 2A depicts the tine (24) being directed towards the target point (7) at the top of the stroke position, while FIG. 2B depicts the tine (24) extending through the target point (7) as the head (25) reaches bottom of the stroke position. FIG. 2B further depicts a travel path (8b) of the bottom end (e.g., tip) of the tine (24) during the course of the upward and/or downward motion of the tine head (25), creating a narrow hole (8a) in the soil (2) defined by the travel path (8b). The width of the hole at the bottom end (8c) of the hole (8a) and at the top end of the hole (8a), located adjacent the target point (7), is shown being narrower than at the intermediate area of the hole (8a), located between the top end and the bottom end (8c) of the hole (8a). Please note that the arc shaped travel path (8b) is exaggerated for description/clarification purposes.

FIGS. 2A and 2B further show the upper linkage arm (35) having a coil spring (36) positioned thereabout, wherein the first end of the coil spring (36) can exert a force against the top of the support arm (20), thereby biasing the support arm (20) against a bumper ring (34) at the end of the upper linkage arm (35). The position of the bumper ring (34) can be adjusted along the axis of the upper linkage rod (35) by rotating a stop nut (38) to set, adjust, or calibrate the desired angle of tine (24) penetration into the soil (2), which includes ground, grass, and/or turf. The second end of the coil spring (36) is shown being positioned against a stop ring, which is maintained in position along the upper linkage arm (35)

Although FIGS. 2A-4B, depict one quantity of each element described above, it should be understood that the soil aerator (10) can comprise a plurality of elements such as drive arms (41), upper linkage arms (35), lower linkage arms (30), and tine heads (25), which are connected to the drive system (40) and the frame (50) to form the soil aerator (10), as depicted in FIG. 1. It should be understood that each tine attachment member (21) can hold therein a single tine (24) or a plurality of tines. Lastly, it should also be understood that each of the above elements can include the same or a substantially similar configuration and can function in the same or a substantially similar fashion as depicted in FIGS. 2A-4B and described in the present disclosure.

Figure 3:
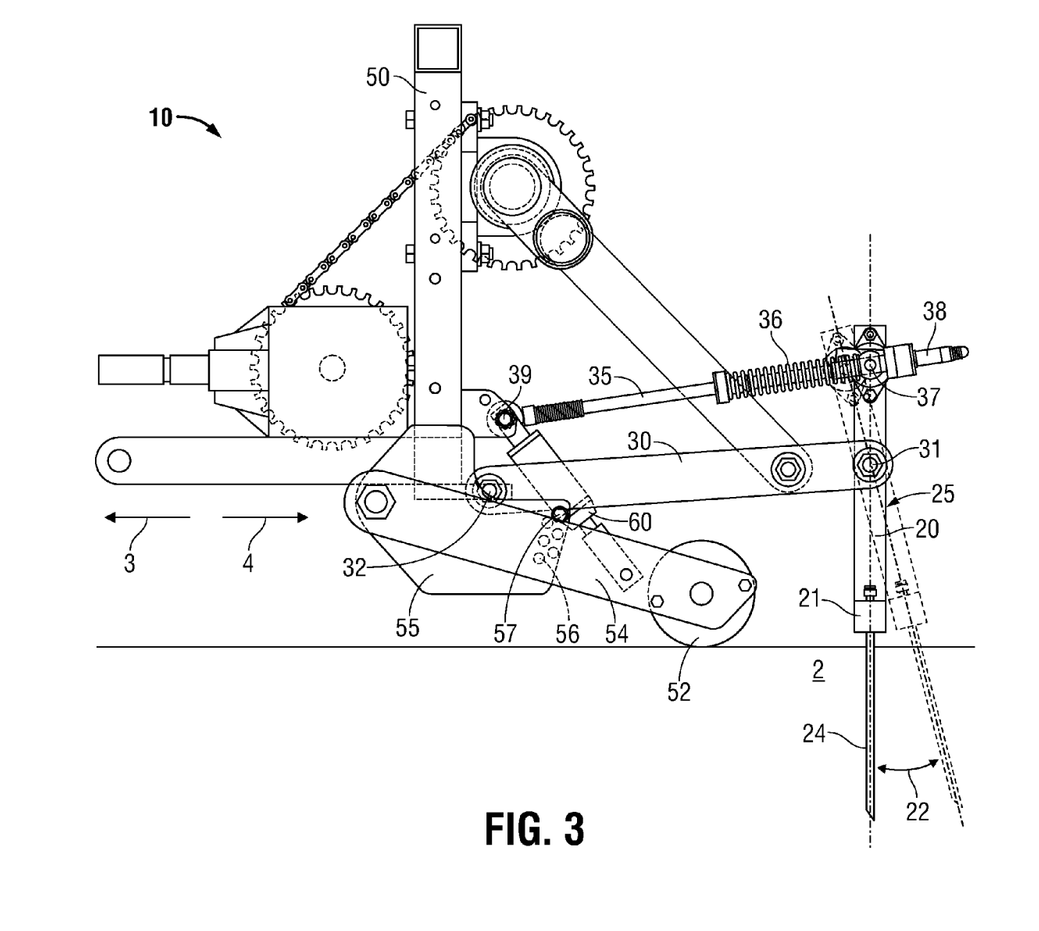
FIG. 3 depicts a cross-sectional side view of an embodiment of a soil aerating apparatus in accordance with the present disclosure, showing a tine head located in bottom of stroke position.

Referring now to FIG. 3, depicting a side cross-sectional view of an embodiment of a soil aerator (10) in accordance with the present disclosure. FIG. 3 depicts the soil aerator (10) comprising the support arm (20) that is movable (i.e., rotatable) forward and backward, along the upper linkage arm (35). A tine entry angle (22) is adjustable by rotating the adjustment nut (38) either forward or backwards along a threaded portion of the upper linkage arm (35). The upper portion of the tine head (25) can be pinned in place at the upper head pivot (37) and held in that position by the spring (36) to set the angle (22) of tine (24) entry into the soil (2). The adjustment nut (38) lets the operator adjust the angle of tine (24) entry into the soil (2), wherein the angle (22) can be either neutral, positive, or negative. Once the support arm (20) position is locked in place, the tine (24) will enter and extend through the soil (20) through essentially the same target point (7) every time, regardless of the length of tine (24) used or depth of tine (24) penetration into the soil (2). For optimal operation, the angle (22) can be adjusted to a neutral setting, which is essentially perpendicular with the soil (2). It should be understood that other adjustment means, known in the art, to set the position of the support arm (20) along the upper linkage arm (35) can be used and are within the scope of present disclosure. In another embodiment (not shown), the support arm (20) can comprise a threaded pivoting member therein, wherein rotating the support arm (20) and/or the upper linkage arm (35), moves the threaded pivoting member, and the support arm (20), along the upper linkage arm, adjusting the angle (22).

Referring again to FIGS. 2A and 2B, the soil aerator (10) in accordance with the present disclosed further comprises a tine head (25) having an long configuration, with the lower head pivot (31) being located high above the soil (2). FIGS. 2A and 2B show the lower head pivot (31) being positioned closer to the upper head pivot (37) than to the soil (2) surface and slightly higher than the lower frame pivot (32). In another embodiment (not shown), the lower head pivot (31) can be positioned at about the midpoint between the upper head pivot (37) and the lower end of the tine head (25). In another embodiment (not shown), the lower head pivot (31) can be positioned at about the same vertical position as the lower frame pivot (32). Furthermore, the lower head pivot (31) can be located between 5 and 20 inches above the soil (2), at the bottom of stroke position, as depicted in FIG. 2B. The above configuration can allow the lower linkage arm (30) to remain essentially parallel with the soil (2), or at a small incline relative to the soil (2), as the tine is fully inserted into the turf. A long support arm (20) allows a roller (52) to be implemented between the frame (50) and the support arm (20). Furthermore, a relatively high lower head pivot (31) location can result in less turf damage as the tine head (25) and the tine (24) may pivot forward with the motion of the tractor, with the soil (2) surface acting as the fulcrum of the tine head (25) and tine (24) assembly. Specifically, the tine head (25) and the tine (24) can undergo a minimal amount of pivoting, caused by the forward movement of the soil aerator (10), as the tine (24) is withdrawn from the soil (2). A lower head pivot, located close to the soil (2) (not shown), can result in significant tine rotation, which in turn damages the grass roots. A lower head pivot, located close to the soil (2), can result in the tine being dragged along the soil (2) surface, ripping or forming a slit in the turf.

Another advantage to the soil aerator (10), in accordance with the present disclosure, is the horizontal motion of the tine head (25) relative to the frame (50), in addition to the vertical motion of the tine head (25) during each operating cycle. Specifically, on the downstroke of the tine head (25), the tine head (25) and the tine (24) move away from the frame, while on the upstroke, the tine head (25) and the tine (24) move closer to the frame (50). Referring again to FIGS. 2A and 2B, showing an embodiment of the soil aerator (10) in the top of stroke position (i.e., highest position of the tine head (25) during the operating cycle) and the bottom of stroke position (i.e., lowest position of the tine head (25) during the operating cycle) in accordance with the present disclosure. During soil aerating operations, the speed at which the soil aerator (10) is moved in the forward direction (3) can be synchronized with the average speed of the horizontal movement of the tine head (25) as it moves away from the frame (50) during the downstroke motion of the tine head (25). When the two speeds are essentially the same, the tine head (25) and the tine (24) are positioned essentially still with respect to the soil (2), as the tine (24) is inserted therein. The tine head (25) and the tine (24) are maintained essentially perpendicular to the soil (2) at the time of entry and until it reaches the bottom of the stroke position, thus forming a precise vertical (i.e., perpendicular with soil surface) hole within the soil (2). Such a hole would not be possible if a tine (24) had a significant angle of entry (22) and/or if the tine (24) changed angles, in a sweeping motion, as the tine (24) was penetrating the soil (2). Therefore, the tine (24) stays relatively perpendicular in the soil (2) during the downward stroke, while the tine head (25) is moving away from the frame (50) to stay in sync with the forward (3) motion of the soil aerator (10). As a result, the tine (24) can remain generally perpendicular to the turf (2), since the tine (24) is moving away from the aerator frame (50) and is not being pulled forward (3) along the soil (2).

In another embodiment (not shown) of the soil aerator (10), the direction of the soil aerator (10) movement (e.g., the direction of the tractor pulling the soil aerator (10)) may be opposite that of FIGS. 2A and 2B, and thereby the tine head (25) can be synchronized with the motion of the soil aerator (10) during the upstroke movement of the tine head (25), as the tine head (25) is moving closer to the frame (50) along the horizontal plane.

The tine head (25) and the tine (24) may rotate only a minimal amount during the upstroke, because of the high position of the lower head pivot (31). Specifically, as the soil aerator moves in the forward direction (3), the lower linkage arm (30) will pull the tine support arm (20) in the forward direction (3) (i.e., towards the direction of travel) during the upstroke. However, because of the relatively high position of the lower head pivot (31), the tine support arm (20) will experience a decreased amount of angular movement compared to a tine support arm having a lower head pivot located close to the fulcrum (e.g., soil surface).

Figure 4A:
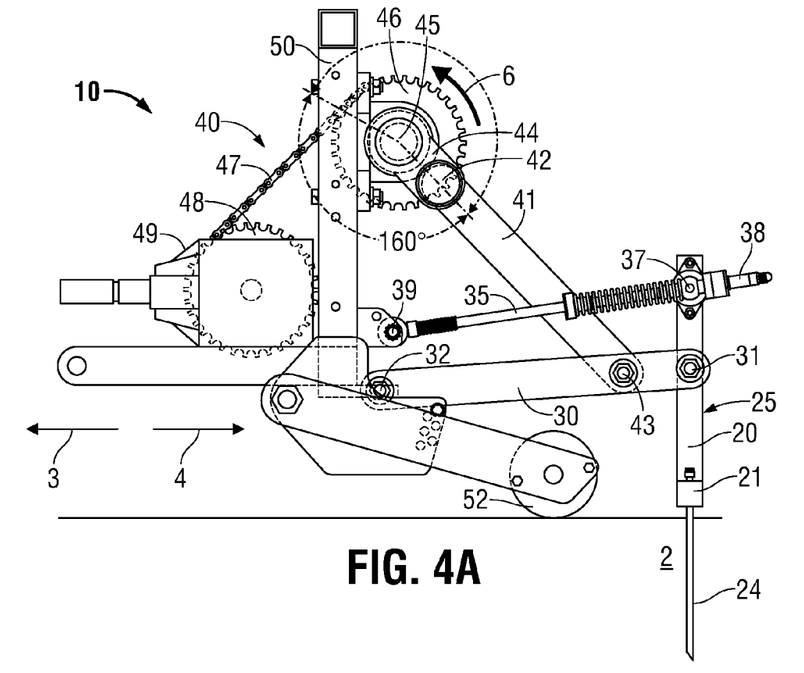
FIG. 4A depicts a cross-sectional side view of an embodiment of a soil aerating apparatus in accordance with the present disclosure, showing a tine head located in bottom of stroke position.
Figure 4B:
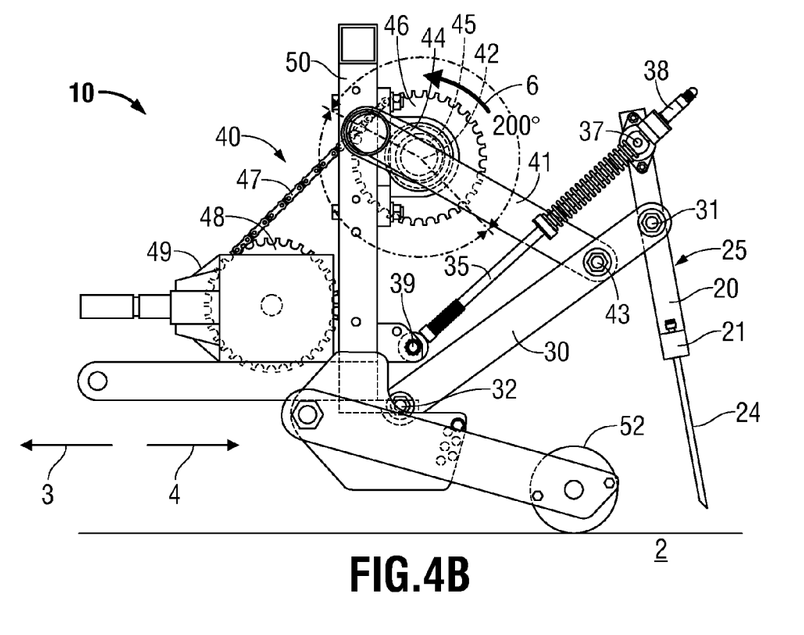
FIG. 4B depicts a cross-sectional side view of an embodiment of a soil aerating apparatus in accordance with the present disclosure, showing a tine head located in top of stroke position.

Referring now to FIGS. 4A and 4B, showing an embodiment of the soil aerator (10) in accordance with the present disclosure. More particularly, FIGS. 4A and 4B depict the soil aerator (10) drive system (40) connected to the lower linkage arm (30) by the drive arm (41). By adjusting the location of the lower drive rod pivot (43), which pivotally connects the drive arm (41) along the length of the lower linkage arm (30), more torque and/or power can be produced. The soil aerator (10) can produce at least 15%-20% more tine driving power than prior art soil aerators by adjusting the positioning of the lower drive rod pivot (43) along the lower linkage arm (30).

As further depicted in FIGS. 4A and 4B, the drive system (40) is shown comprising a gear box (49) driven by the power take-off (PTO) assembly (not shown), which transmits torque from the tractor (not shown) to the gear box (49). The gear box (49), in turn, drives the crankshaft (44) by a chain (47) and sprocket (46, 48) assembly. Please note that the chain (47) is only partially shown for clarity purposes. The drive system (40) can be adapted to rotate the crankshaft (44) in the counterclockwise direction (6), as viewed from the perspective in FIGS. 4A and 4B. The crankshaft (44) can comprise a plurality of central journals (45, only one shown) (e.g., central shaft portions) and a plurality of eccentric shafts (42, only one shown) (e.g., offset shaft portions), wherein the crankshaft eccentric shaft (42) can move in the forward direction (3) (e.g., toward the frame (50)) as the eccentric shaft (42) passes over the central journal (45) (e.g., the top or 12:00 o'clock position) during each cycle of operation. Prior art soil aerating machines (not shown) utilize a clockwise (i.e., oppositely) rotating crankshaft. Counterclockwise rotation (6) delivers more driving power to the lower linkage arm (30), which, in turn, accelerates the tine head (25) and the tine (24) to a higher downward velocity, resulting in faster soil (2) penetration and retraction therefrom. This action produces a "hammer stroke" type effect, driving the aerating tine (24) into the ground with greater momentum and slows down at the top of the stroke position, allowing the soil aerator (10) to advance horizontally along the soil (2) surface.

The advantages of this "hammer stroke" effect include a lesser horsepower requirement for the performance of the same work, smoother soil (2) penetration from the tines entering and exiting the ground quickly, more versatility as the same soil aerator (10) can be used to aerate fine sand based turf fields and heavier, more compacted soils. Also, the overall weight of the soil aerator (10) is reduced, which results in less damage to the turf fields from the weight of the equipment and can allow for use with smaller drive tractors (not shown). The "hammer stroke" effect can be magnified by including solid stock upper and lower linkage arms (35, 30) and/or a solid stock tine head (25) for added weight for generating more momentum to assist in driving the tine (24) into the soil (2). Therefore, the "hammer stroke" effect of the soil aerator (10), with weighted components, delivers more penetrating power than the prior art designs.

Furthermore, by rotating the crankshaft (44) counterclockwise, a majority of the rotation (i.e. typically about 50% to 70%) of the crankshaft (44) is utilized in moving the lower linkage arm (30) and the tine head (25) toward and through the top of stroke position (i.e., highest position), while a minor portion (i.e., typically about 30% to 50%) of the crankshaft (44) rotation is used to move the lower linkage arm (30) and the tine head (25) in the downward direction toward and through bottom of stroke position (e.g., the lowest position, closest to the soil (2)). Faster downward movement of the tine head (25) is desirable, as greater momentum is generated by the tine head (25), which eases soil (2) penetration and reduces the magnitude of reaction forces due to friction between the tine (24) and the soil (2), resulting in smoother soil aerator (10) operation.

The soil aerator (10) configuration, as depicted in FIGS. 4A and 4B, results in a fast reversal of direction in the movement of the tine head (25) at the bottom of stroke and a slow reversal of direction in the movement of the tine head (25) at the top of stroke. The depicted configuration minimizes the total time that the tine (24) is positioned under the soil (2), while maximizing the total time that the tine (24) is positioned above the soil (2) between soil penetrations. As the amount of time each tine (24) is positioned under the soil (2) surface is reduced, the amount of damage to the soil (2) surface and grass roots is also reduced. Specifically, faster soil (2) penetration results in less angular rotation of the tine head (25) and the tine (24) during each soil (2) penetration cycle caused by the forward movement of the soil aerator (10), thereby minimizing the size of the hole formed by the tine (24) underneath the soil (2) surface, adjacent to the roots of the grass. Furthermore, the damage to the soil (2) surface is also minimized, as any dragging motion of the tine (24) along the soil (2) surface is also minimized. In the embodiment of the turf aerator depicted in FIGS. 4A and 4B, the tine head (25) is lifted by turning the crankshaft (44) 200 degrees, while the tine head (25) is lowered by turning the crank shaft 160 degrees, however other embodiments (not shown) of the soil aerator (10) can include other rotational relationships.

Prior art soil aerator designs (not shown), utilizing a clockwise (i.e., opposite) crankshaft rotation, typically utilize approximately 50% to 70% of the crankshaft rotation on the downward motion of the tine head and 30% to 50% on the upward motion of the tine head. In effect, such prior art soil aerators have a much slower speed while driving tine heads downward, thereby reducing the soil penetrating energy (e.g., tine momentum) at the tines. Furthermore, these prior art soil aerators have a much faster speed returning the support arms to the top of the stroke position, thus jerking the tine heads in the upward direction, which causes problems as the tine attachment members (21) and/or the tine (24) are thrown outward and can come out of position during operation. For this reason, prior art soil aerators utilize heavy springs and shock absorber attachments (not shown) to reduce or prevent jerking and/or shock caused by rapid deceleration of the support arm at the top of stroke position. Soil aerator (10) of the present disclosure comprises a tine head (25) that slows down on the upward stroke to minimize throwing the tine head (25) outward. Furthermore, the tine head (25) is decelerated by the soil (2) as the tine (24) penetrates the soil (2), thus reducing the jerking and/or shock generated when the tine head (25) reaches the bottom of stroke position. Therefore, because of the absence of jerking and/or shock associated with the clockwise rotation in prior art soil aerators, the soil aerator (10) of the present disclosure can be cycled at higher rates, thus reducing the amount of time required to treat a designated area of soil (2).

Referring again to FIG. 3, showing an embodiment of the soil aerator (10) in accordance with the present disclosure, wherein the soil aerator (10) comprises a roller (52) configured to improve the overall performance of the soil aerator (10) and deliver more downward force to drive the tine (24) into the ground (2). More particularly, FIG. 3 shows the soil aerator (10) comprising the roller (52) positioned behind the aerator frame (50) and in close proximity to the front of the tine head (25), wherein the front of the tine head (25) is facing in the forward direction (3). As further depicted in FIG. 1, the roller (52) is shown having an elongated cylindrical configuration and is rotatably attached to the bottom of the aerator frame (50) via a roller arm (54), which extends out behind the frame (50), positioning the roller (52) in close proximity to the tine head (25).

FIG. 3 further depicts a stop device (55) usable to set the vertical distance that the roller (52) is positioned below the frame (50), thus setting the minimum vertical distance that the frame (50) should be positioned above the soil (2). The stop device (55) is depicted comprising a plurality of holes (56) adapted to receive a pin (57) therethrough. Once inserted into one of the holes (56), the pin (57) can create a stop, which the roller arm (54) contacts to prevent further upward movement of the roller arm (54). FIG. 3 further depicts a fluid cylinder (60) pivotally connected between the frame (50), at upper frame pivot (39), and the roller arm (54). The fluid cylinder (60) can be adapted to receive pressurized air or hydraulic fluid to lift the frame (50) higher off the soil (2) surface, or to maintain the roller arm (54) against the pin (57) to retain the roller arm (54) and the roller (52) at a set position during soil aerating operations. Lastly, the fluid cylinder (60) can be used as a shock absorber, thereby cushioning or reducing vertical shock experienced by the soil aerator (10) during soil aerating operations.

In various embodiments of the soil aerator (10), the roller (52) can be two to ten inches in front of (i.e., in the forward direction (3) from) the tine head (25), or as close as possible to the tine head (25) without making contact with the support arm (20) or the tine attachment member (21) during aerating operations. Although placing the roller (52) in close proximity to the support arm (20) is optimal, placing the roller any distance between the aerator frame (50) and the tine head (25) improves the overall performance of the soil aerator (10). Specifically, the roller (52), positioned behind (i.e., in the rearward direction (4)) the aerator frame (50), can add additional weight at the tine head (25) to improve soil aerator (10) stability, smoothness of operation, and soil penetration. In an embodiment of the soil aerator (10), the roller (52) can be located as far as 30 inches or more behind the frame (50), providing additional downward force to the tine head (25), without actually increasing the weight of the soil aerator (10). Specifically, the closer the roller (52) is located to the tine head (25) the more of the actual weight of the roller (52) can be supported by the tine head (25) and the tine (24) as the tine (24) is inserted into the soil (2). Accordingly, when the tine (24) enters heavily compacted soils, the reaction forces are less likely to lift the soil aerator (10) off the soil (2) surface, due to the weight of the roller (52) providing additional downward force at the tine head (25).

In addition, a roller (52) can create a pivot point about which the soil aerator can pivot during soil aerating operations. Positioning of the roller (52) close to the tine head (25) moves such a pivot point toward the tine head (25). A pivot point located close to or underneath the frame can result in operating recoil (i.e., reaction forces generated at the tine head) to thrust the soil aerator forward (3), towards the tractor, causing premature wear to the PTO and other attachments extending between the soil aerator and the tractor (not shown). Pivoting movements about the pivot point can also disrupt proper aeration by causing the tines (not shown) not to penetrate the soil (2) to the full preset depth. However, the recoil generated by the present soil aerator (10) is directed essentially straight upward and is not re-directed or transmitted in the forward direction (3), as there is no pivot point below the frame (50) about which the frame (50) can rotate.

While various embodiments usable within the scope of the present disclosure have been described with emphasis, it should be understood that within the scope of the appended claims, the present invention can be practiced other than as specifically described herein. It should be understood by persons of ordinary skill in the art that an embodiment of the soil aerator (10) in accordance with the present disclosure can comprise all of the improvements/features described above. However, it should also be understood that each improvement/feature described above can be incorporated into a soil aerator (10) by itself or in combinations, without departing from the scope of the present disclosure.

What is claimed is:

1. A soil aerating apparatus movable along a soil surface in a first direction during soil aerating operations, wherein the soil aerating apparatus comprises:
   a frame assembly;
   a crankshaft rotatably attached to the frame assembly, wherein the crankshaft comprises a plurality of central shaft sections and a plurality of eccentric shaft sections, the crankshaft structured and operable to rotate in a counterclockwise direction such that each eccentric shaft section will move in the first direction when each eccentric shaft section is positioned above the plurality of central shaft sections during soil aerating operations; and
   a plurality of reciprocating arm assemblies, wherein each reciprocating arm assembly comprises:
      a tine holder for retaining a tine;
      an upper arm having a first end and a second end, wherein the first end of the upper arm is pivotally attached to the tine holder at a first upper pivot point, wherein the second end of the upper arm is pivotally attached to the frame assembly at a second upper pivot point;
      a lower arm having a first end and a second end, wherein the lower arm is positioned below the upper arm, wherein the first end of the lower arm is pivotally attached to the tine holder at a first lower pivot point, wherein the second end of the lower arm is pivotally attached to the frame assembly at a second lower pivot point; and
      a drive arm having a first end and a second end, wherein the first end of the drive arm is pivotally attached to a first eccentric shaft section of the plurality of the eccentric shaft sections, and wherein the second end of the drive arm is pivotally attached to the lower arm between the first lower pivot point and the second lower pivot point.

2. The soil aerating apparatus of claim 1, wherein the second upper pivot point is positioned farther in a second direction relative to the second lower pivot point, wherein the second direction is opposite the first direction.

3. The soil aerating apparatus of claim 2, wherein a distance between the first upper pivot point and the first lower pivot point is larger than a distance between the second upper pivot point and the second lower pivot point.

4. The soil aerating apparatus of claim 2, wherein a distance between the first upper pivot point and the second upper pivot point is smaller than a distance between the first lower pivot point and the second lower pivot point.

5. The soil aerating apparatus of claim 1, wherein more than half of the rotational motion of the crankshaft is used to move the tine holder in the upward direction, wherein less than half of the rotational motion of the crankshaft is used to move the tine holder in the downward direction.

6. The soil aerating apparatus of claim 1, wherein the tine holder is directed at essentially a single point as the tine holder moves during soil aerating operations.

7. The soil aerating apparatus of claim 1, wherein the first lower pivot point is located above a midpoint along the length of the tine holder.

8. The soil aerating apparatus of claim 1, further comprising:
   a single roller positioned underneath the lower arm between the frame assembly and the tine holder; or a plurality of rollers positioned only underneath the lower arm between the frame assembly and the tine holder.

9. The soil aerating apparatus of claim 8, wherein the single roller or the plurality of rollers are positioned closer to the tine holder than to the frame assembly.

10. The soil aerating apparatus of claim 8, further comprising:
a roller arm having a first end and a second end, wherein the first end of the roller arm is pivotally connected to the frame, wherein the second end of the roller arm is connected to the roller or the plurality of rollers, and wherein the soil aerating apparatus further comprises a stop mechanism to prevent the roller arm from rotating toward the lower arm, thereby setting a distance between the frame assembly and the soil surface.

11. A method of aerating soil comprising the steps of:
providing a soil aerating apparatus comprising:
a frame;
a crankshaft attached to the frame, the crankshaft comprising a plurality of central shaft sections and a plurality of eccentric shaft sections;
a tine holder;
an upper arm connected to the frame and to the tine holder;
a lower arm connected to the frame and to the tine holder; and
a driving arm connected to the crankshaft and to the lower arm;
moving the soil aerating apparatus at a first horizontal speed in a first horizontal direction along a soil surface;
rotating the crankshaft in a counterclockwise direction such that each eccentric shaft section will move in the first horizontal direction when each eccentric shaft section is positioned above the plurality of central shaft sections as the soil aerating apparatus is moved in the first horizontal direction, thereby:
moving the tine holder from its highest position to its lowest position in a first period of time; and
moving the tine holder from its lowest position to its highest position in a second period of time, wherein the second period of time is longer than the first period of time.

12. The method of claim 11, further comprising the steps of:
extending the tine into the soil through a single point along the soil surface; and
retracting the tine from the soil through the single point along the soil surface.

13. The method of claim 11, further comprising the steps of inserting the tine into the soil to create a hole having an upper end adjacent to the soil surface, a lower end opposite the upper end, and an intermediate portion between the upper end and the bottom end, wherein the intermediate portion is wider than at the bottom end of the hole.

14. The method of claim 11, further comprising the steps of:
providing a crankshaft comprising a central portion and an eccentric portion, wherein the driving arm is connected to the eccentric portion; and
rotating the crankshaft, whereby the eccentric portion rotates about the central portion, whereby the eccentric portion moves in the first direction when the eccentric portion passes above the central portion.

15. The method of claim 11, wherein the step of moving the tine holder from its highest position to its lowest position comprises:
moving the tine into the soil at a first vertical speed, thereby moving the tine in a second horizontal direction away from the frame at a second horizontal speed, wherein the second horizontal direction is opposite the first horizontal direction; and
synchronizing the first horizontal speed of the frame with respect to the soil surface with the second horizontal speed of the tine holder with respect to the frame to be equal but in opposite directions, thereby causing the tine holder to remain essentially still with respect to the soil surface.

16. The method of claim 11, further comprising the step of:
supporting the soil aerating apparatus by a single roller positioned underneath the lower arm between the frame assembly and the tine holder; or
supporting the soil aerating apparatus by a plurality of rollers positioned only underneath the lower arm between the frame assembly and the tine holder.

17. A soil aerating apparatus adapted for moving along the soil surface in a first direction, wherein the soil aerating apparatus comprises:
a plurality of arm assemblies, wherein each arm assembly comprises:
a tine holder arm for retaining a tine;
an upper arm having a first end and a second end, wherein the first end of the upper arm is pivotally attached to the tine holder at a first upper pivot point, wherein the second end of the upper arm is pivotally attached to a frame at a second upper pivot point;
a lower arm having a first end and a second end, wherein the lower arm is positioned below the upper arm, wherein the first end of the lower arm is pivotally attached to the tine holder at a first lower pivot point, wherein the second end of the lower arm is pivotally attached to the frame at a second lower pivot point; and
a drive arm having a first end and a second end, wherein the first end of the drive arm is pivotally attached to a first eccentric shaft section of a plurality of eccentric shaft sections, wherein the second end of the drive arm is pivotally attached to the lower arm between the first lower pivot point and the second lower pivot point,
wherein the second upper pivot point is positioned farther in a second direction relative to the second lower pivot point, wherein the second direction is opposite the first direction, wherein a distance between the first upper pivot point and the first lower pivot point is larger than a distance between the second upper pivot point and the second lower pivot point, and wherein a distance between the first lower pivot point and the second lower pivot point is larger than a distance between the first upper pivot point and the second upper pivot point.

18. The soil aerating apparatus of claim 17, further comprising a tine connected to the tine holder arm, wherein the tine points at a single location as the tine holder arm moves in the upward or in the downward direction during soil aerating operations.

19. The soil aerating apparatus of claim 17, wherein a distance between a bottom end of the tine holder arm and the first lower pivot point is larger than the distance between the first lower pivot point and the first upper pivot point.

20. The soil aerating apparatus of claim 17, further comprising a tine in connection with the tine holder arm, wherein the tine makes a hole in the soil, wherein an intermediate portion of the hole is wider than a bottom portion of the hole.

21. A soil aerating apparatus movable along a soil surface in a first direction during soil aerating operations, wherein the soil aerating apparatus comprises:
a frame assembly;
a crankshaft rotatably attached to the frame assembly, wherein the crankshaft comprises a plurality of central shaft sections and a plurality of eccentric shaft sections, wherein each eccentric shaft section moves in the first direction when each eccentric shaft section is positioned above the plurality of central shaft sections during soil aerating operations; and
a plurality of reciprocating arm assemblies, wherein each reciprocating arm assembly comprises:
a tine holder for retaining a tine;
an upper arm having a first end and a second end, wherein the first end of the upper arm is pivotally attached to the tine holder at a first upper pivot point, wherein the second end of the upper arm is pivotally attached to the frame assembly at a second upper pivot point;
a lower arm having a first end and a second end, wherein the lower arm is positioned below the upper arm, wherein the first end of the lower arm is pivotally attached to the tine holder at a first lower pivot point, wherein the second end of the lower arm is pivotally attached to the frame assembly at a second lower pivot point; and
a drive arm having a first end and a second end, wherein the first end of the drive arm is pivotally attached to a first eccentric shaft section of the plurality of the eccentric shaft sections, and wherein the second end of the drive arm is pivotally attached to the lower arm between the first lower pivot point and the second lower pivot point,
wherein the second upper pivot point is positioned farther in a second direction relative to the second lower pivot point, wherein the second direction is opposite the first direction, wherein a distance between the first upper pivot point and the second upper pivot point is smaller than a distance between the first lower pivot point and the second lower pivot point.

22. The soil aerating apparatus of claim 1 further comprising a spring disposed on the upper arm, the spring structured and operable to adjust a penetration angle of the tine.

\* \* \* \* \*